July 20, 1965  N. E. FOXX ET AL  3,196,241
INDUCTION WELDING OF TUBING FROM HOT STRIP
Filed Nov. 8, 1962  2 Sheets-Sheet 1
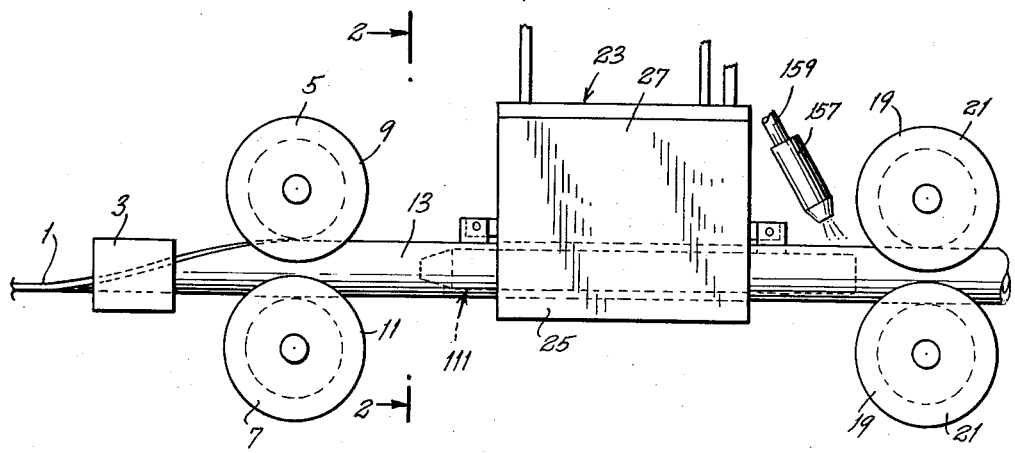
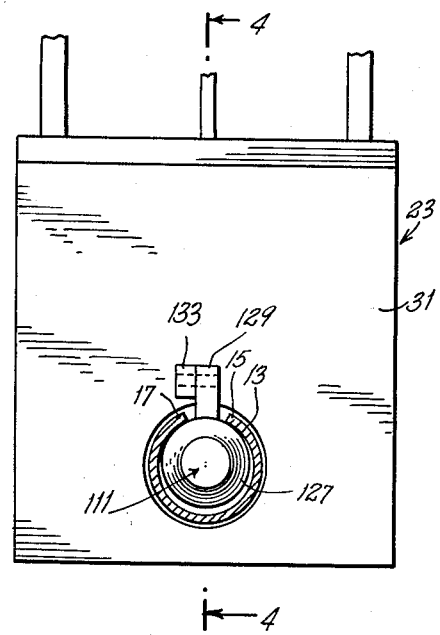
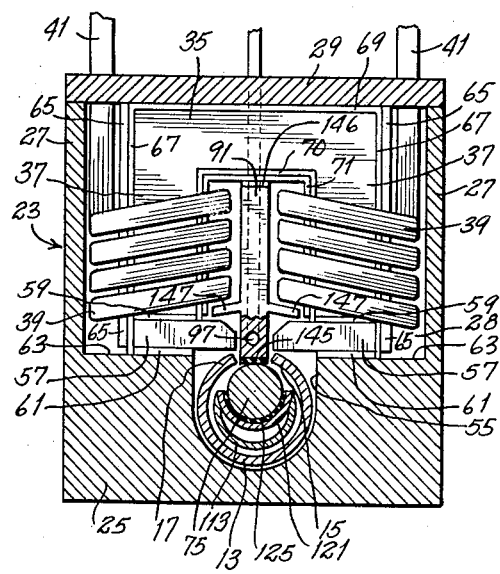
INVENTORS
NORBERT E. FOXX
THOMAS O. WILLIAMS
BY Robert S. Dunham
ATTORNEY

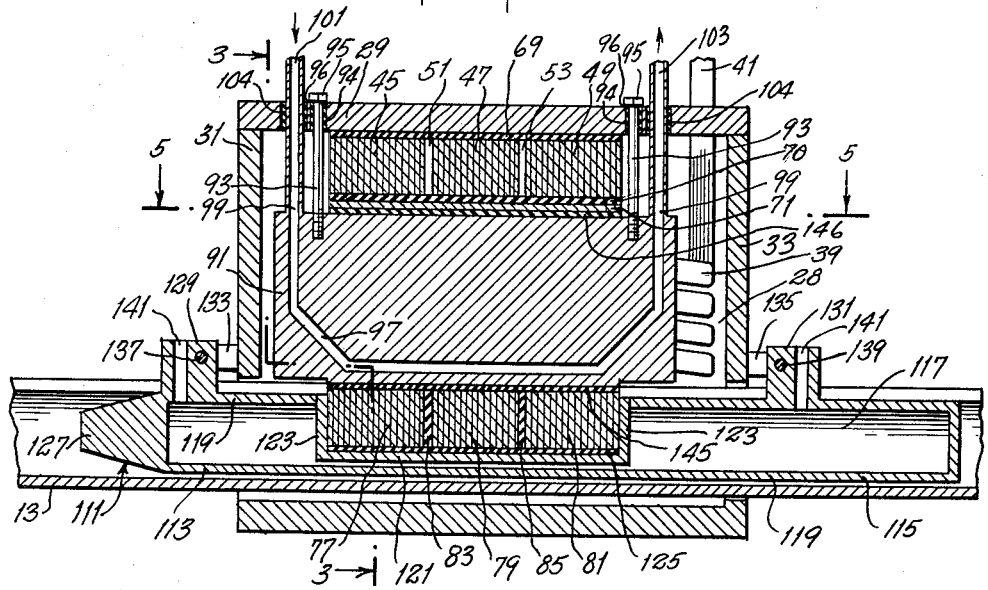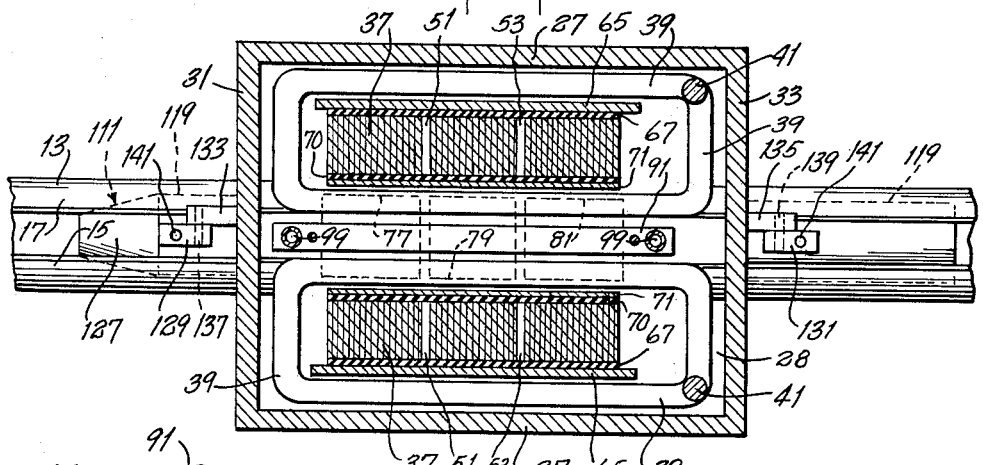

United States Patent Office 3,196,241
Patented July 20, 1965

3,196,241
INDUCTION WELDING OF TUBING FROM HOT STRIP
Norbert E. Foxx, Cuyahoga County, and Thomas O. Williams, Lake County, Ohio, assignors to Republic Steel Corporation, Cleveland, Ohio, a corporation of New Jersey
Filed Nov. 8, 1962, Ser. No. 236,780
21 Claims. (Cl. 219—8.5)

This invention relates to apparatus for and method of welding tubing along a longitudinal seam. The invention more especially relates to induction welding of the edge portions of a tube blank lengthwise thereof to form the longitudinal seam. The invention more particularly relates to induction welding of hot strip iron or steel tube blanks to form the longitudinal seam closing the tube.

It is conventional in the art of forming seamed tubes or pipes to form a tube blank, usually from a flat strip of rectangular cross-section, by bending the strip transversely of its length into generally cylindrical form and bringing the edge surfaces of the thus formed tube blank into engagement while continually heating these edge portions to welding temperature and applying pressure thereto to effect the welding of the edge portions together. Many forms of apparatus have been utilized for this purpose, including magnetic induction apparatus in which an alternating magnetic field or circuit is provided, the edge portions of the tube blank being disposed in or adjacent to portions of the magnetic path for the purpose of developing eddy currents in these edge portions with resultant heating thereof to the welding temperature of the material of which the tube blank is made. In some of the devices of the prior art means for producing a magnetic field is disposed outwardly of the tube blank and in such position in relation to the edge portions of the tube blank that the magnetic flux passes through these edge portions generally transversely of the transverse edge surfaces thereof which are to be brought into engagement and welded together. In other cases means for producing the magnetic field is disposed so that the eddy currents set up in the edge portions circulate in these edge portions along the longitudinal edges of the tube blank which are to be brought into engagement for welding.

In some of the prior art constructions also a member of magnetic material is disposed within the tubular blank adjacent to edge portions thereof and in opposed relation to the means for producing the magnetic flux disposed outwardly of the tube blank with a view to causing the flux along the edge portions of the tube blank to flow in a path including the inwardly disposed magnetic member.

The invention constitutes an improvement over the prior art in the apparatus and the method carried out thereby for induction welding. This improvement essentially is concerned with the control of the magnetic circuit and particularly the portion of its path which is adjacent and passes through the edge portions of the tube blank which are to be welded together by induction heating of these edge portions.

It is an object of the invention to provide an induction heating apparatus in which the magnetic flux utilized is confined to a circuit which extends generally transversely of the respective adjacently disposed edge portions of the tube blank.

It is another object of the invention to provide induction heating apparatus in which the magnetic flux is developed exteriorly of the tube blank and is confined to a circuit which extends transversely of one edge portion of the tube blank and returns transversely through the other edge portion of the tube blank.

It is a further object of the invention to provide both exteriorly of and interiorly of the tube blank a magnetic circuit of low reluctance, while confining the magnetic flux in this circuit to pass transversely of both edge portions of the tube blank that are adjacent to each other and which are to be brought together and welded together.

It is an additional object of the invention to provide novel apparatus for induction heating which may be easily controlled and operated and which is constructed so as to confine the flux in the magnetic circuit to which reference has been made above.

It is a still further object of the invention to provide a construction of an electromagnetic induction heating apparatus which will provide for confining flux in a magnetic circuit which passes transversely of the edge portions of the tube blank and is capable of being assembled and disassembled for access to and replacing of parts which are subject to deterioration due to the heating while maintaining the main structure of the apparatus.

It is another object of the invention in an induction heating apparatus of the type to which reference is made to limit the stray currents while also confining the magnetic flux against leakage thereof from the predetermined magnetic circuit.

The objects above mentioned and others are accomplished by utilizing in the apparatus means providing a magnetic circuit the main portion of which is disposed exteriorly of the tube blank. The circuit preferably includes also an inner portion providing a path for the magnetic flux within the tube blank, this circuit passing transversely through the edge portions of the tube blank that are disposed adjacent to each other but spaced apart for the heating operation and not yet brought into engagement for welding. The exterior portion and preferably both portions of the magnetic circuit are provided by means affording low magnetic reluctance, these two means respectively being disposed outwardly and inwardly of the tube blank and in closely adjacent relation to the edge portions of the tube blank with sufficient clearance, however, to provide for movement of the tube blank lengthwise thereof and relative to the two flux carrying means.

In such a basic structure, in accordance with an important feature of the invention, a magnetic flux barrier is disposed with an edge portion thereof adjacent to the space between edge portions of the tube blank. Having regard to the closely spaced relation of the exterior flux developing means to the adjacent exterior surfaces of the spaced edge portions of the tube blank, this magnetic flux barrier which may be provided by a highly conductive material is effective to force the magnetic flux into and to confine this flux in a path which is transverse to the exterior surfaces of the edge portions of the tube blank. The action of the magnetic flux barrier is to block the flux from taking a path exterior to the tube blank and to force the flux into the edge portions thereof. The barrier prevents shunting of the flux without passing through at least a major part of the adjacently disposed but spaced portions of the tube blank so that their edge portions will be more highly heated. Especially by providing a low magnetic reluctance in the inner portion of the circuit the flux will be carried through the edge portions of the blank transversely of both their surfaces. This action is accomplished because the flux which tends to short-circuit in the exterior path strikes the barrier and generates therein eddy currents which in turn produce flux 180° out of phase with the flux provided by the flux developing means. The reaction of this counter flux is such that the main flux is deflected to a path which is transverse to the surfaces of the edge portions of the tube blank and may continue within the space within the tube blank and in the means providing the inner portion of the magnetic circuit, especially when of low magnetic reluctance.

As will be understood more clearly from the description taken in connection with the drawings the flux developing means disposed exteriorly of the tube blank may be an electromagnetc coil having a core of low reluctance such as may be provided by a conventional structure utilizing ferromagnetic laminations. The means disposed within the tube and providing the inner portion of the magnetic circuit also may be of similar construction utilizing low reluctance ferromagnetic laminations. Whatever may be the material of the tube blank which is to be welded, the provision of an electro magnetic flux developing means and flux carrying means within the tube with which the novel flux barrier of the invention cooperates insures highly efficient heating of the edge portions of the tube blank as compared with the means proposed in the prior art. The power factor also is substantially improved and the requisite control of temperature may be accomplished for a substantial range of speed of the forward movement of the tube through the heating apparatus.

These and other objects and features of the invention will be more clearly understood from the description to follow taken in connection with the drawings in which FIG. 1 shows in diagrammatic elevation the apparatus of the invention.

FIG. 2 is a vertical section on line 2—2 of FIG. 1.

FIG. 3 is a vertical section taken on line 3—3 in FIG. 4.

FIG. 4 is a vertical section taken on line 4—4 in FIG. 2.

FIG. 5 is a horizontal section taken on line 5—5 of FIG. 4.

FIG. 6 shows in section a modification of the means providing the magnetic flux circuit and the magnetic flux barrier cooperating therewith.

In FIG. 1 the flat strip or skelp 1, as it is delivered from the apparatus which rolls the hot billets into skelp of generally rectangular cross section, is moved through the first forming device 3 which is a shoe of tapering internal cross section which is effective initially to turn up the edge portions of the strip as it moves toward the tube blank forming rolls 5 and 7. These rolls have an arcuate contour in section in the planes through the axis between the flanges 9, 11 thereof at the respective sides of the rolls. These rolls are effective to bend the edge portions of the tube blank further toward each other but so as to leave the edge surfaces of the blank that are transverse to the face surfaces spaced apart. The tube blank 13 thus becomes generally cylindrical but of incompletely closed form as shown in cross section in FIGS. 2 and 3. In conventional apparatus the thus formed tube blank 13 is moved through a heating zone to bring the temperature of at least the edge portions 15, 17 of the tube blank to welding temperature. The heated blank then is delivered between the welding rolls 19 which are pressure rolls in this embodiment also having arcuate contour in the plane through the axis between the flanges thereto. The relative position and the dimensions of the rolls 19 and of their flanges 21 are such that the heated edge portions of the tube blank are forced into contact and pressed together with a welding pressure. In the apparatus utilized in the present invention the elements thereof so far described are conventional.

Between the tube blank forming rolls 5, 7 and the welding rolls 19 the induction heating apparatus 23 is disposed. This apparatus in the particular embodiment being described comprises an outer casing or shielding structure which consists of a base portion 25 of a highly conductive material such as copper. Extending upwardly from the base portion 25 are side walls 27 also of copper defining therebetween and with the base portion a space 28 within which is mounted the means for providing the magnetic flux. This space is closed by an upper slab or cover 29 which engages the side walls 27 and end walls 31, 33 which extend upwardly from the base portion as shown in FIG. 4. The slab 29 as well as the end walls 31, 33 also are of highly conductive material such as copper. The vertical walls 27, 31, 33 may be formed integrally with the base 25 or, for convenience of assembly and disassembly, these walls and the base may be formed as separate parts which are secured together in electrically conductive relation to each other. The structure thus far described comprising the members 25, 27, 29, 31, 33 therefore constitute a shield of highly conductive material which, because of the development of eddy currents therein and the corresponding counter fluxes, serve to confine the main flux produced by the flux producing means within the space 28. This shielding structure cooperates with other means about to be described to confine the developed flux to the predetermined magnetic circuit.

Within the space 28 as shown in FIGS. 3, 4 and 5, is mounted the U-shaped core 35 of ferromagnetic material. Wound upon the downwardly extending legs 37 of this core are windings 39 of highly conductive material such as copper and of suitable current-carrying capacity and number of turns to develop the required magnetic flux in the core 35 when the terminals 41 of the coils 39 are connected to an alternating current supply of the requisite voltage and frequency. Ordinarily, as in conventional magnetic cores, the core 35 is composed of a plurality of laminations to limit eddy currents within the core. In the embodiment shown the core 35 is composed of three sections, 45, 47 and 49, disposed in side-by-side parallel relation to each other and separated by air gaps 51, 53. It will be understood that the number of sections in the core may be varied within the scope of this invention as required for variations in the size, wall thickness, material of the pipe and the like. Three sections have been shown by way of a representative example. These air gaps may serve also for the disposition therein of tubes for conducting cooling water for the purpose of cooling the core sections. Windings 39 carry suitable insulation.

As shown in FIGS. 3 and 4 the base 25 has formed therein an upwardly open cavity 55 extending fully along the base parallel to the movement of the tube blank through the heating apparatus 23. In the embodiment disclosed, this cavity 55 has a semicircular lower contour and vertical side surfaces. These surfaces of the cavity 55 may engage the exterior generally cylindrical surface of the tube blank and guide the tube blank in its movement forward through the apparatus. This guiding of the tube blank, however, may be accomplished by the supporting action of the mandrel to be described which is disposed within the tube blank or by the cooperation of the mandrel with the surfaces of the cavity 55.

Within the space 28 and adjacent to the lower ends of the legs 37 of the core 35 are disposed pole pieces 57 of ferromagnetic material which also are of laminated form for limiting eddy currents and are divided into sections respectively corresponding to the sections 45, 47, 49 of the core 35. Further to restrict the flow of eddy currents between the pole pieces 57 and the legs 37 of the core, since the pole pieces are separate from the core, a relatively thin layer 59 of insulating material is disposed between the lower end of each leg 37 and the upper surface of the adjacent pole piece 57. It will be understood, because of variations in the thickness of the laminations and because it is not possible to secure alignment and engagement of the respective laminations in the core with those in the pole pieces, that the layers 59 of insulating material prevent the flow of current between the laminations of the core and of the pole pieces, thus limiting eddy currents to those which can flow only through the high surface resistances of the laminations.

Similarly to prevent flow of eddy currents between the pole pieces 57 and the highly conductive base 25 a layer of insulation 61 is disposed between the lower face of each of the pole pieces 57 and the upper surfaces 63 of the base 25. The insulating layers 59, 61 are of such character that the core sections 45, 47, 49 and the pole pieces 57 and the sections thereof may be supported upon the upper surface 63 of the base 25.

For the purpose of more effectively confining the magnetic flux to the magnetic circuit which is defined by the core 35 and its pole pieces 57, curtain walls 65 are secured in suitable manner to and depending from the slab or cover 29. These curtain walls 65 are formed of highly conductive material and extend from the slab 29 downwardly to ends adjacent to the upper surfaces 63 of the base 25. The eddy currents developed in these walls produce counter flux which opposes flux which may tend to leak from the core legs 37. In order to prevent flow of eddy currents between the curtain walls 65 and the core legs 37, vertical layers 67 of insulating material are disposed between curtain walls 65 and the adjacent legs 37. Moreover, between the upper surface of the core 35 and of its respective sections 45, 47, 49 and the cover slab 29 a further layer 69 of insulating material is disposed to prevent the cross flow of currents which may be developed in the upper slab and in the horizontal portion of the core 35. Similarly an insulating layer 70 extends upon the under surface of the core and the inner sides of legs 37 of the core and a layer of conductive material 71 overlies the insulating layer 70 and acts, as do the curtain wall 65, to confine the flux to the core 35 and its legs 37.

From the description thus far given it will be understood that the magnetic flux which is developed in the core 35 upon the energizing of windings 39 is essentially confined to the ferromagnetic material of the core and of the pole pieces 57, and that unless otherwise directed the magnetic circuit would be completed by passing of the flux across the space between the adjacent ends of the horizontally disposed pole pieces 57. In order to secure improved induction heating of the edge portions 15, 17 of the tube blank 13 it is necessary that these edge portions be disposed in the magnetic field. For efficient heating this requirement must be met whatever may be the material of which the tube blank 13 is made. This material may be nonmagnetic or magnetic. Where the tube blank is of ferromagnetic material, in an induction heating device utilizing a magnetic core and pole pieces disposed as shown in FIG. 3, a portion of the flux also would pass into the edge portions 15, 17 of the tube blank and outwardly from these portions through the opposite face surfaces thereof, as well as through the longitudinal edge surfaces that are transverse to these opposite face surfaces and are spaced apart before they reach the welding pressure rolls 19.

In order to provide a path of low reluctance and to confine a greater portion of the flux to flow transversely of the edge portions 15, 17 of the tube blank, within the tube blank may be disposed an inner magnetic core 75 which, as shown in FIG. 4, may be made, for example, in three sections 77, 79, 81 that are spaced apart by insulators 83, 85. The core 75 in the embodiment shown is of circular cross section transversely of the direction of movement of the tube blank and is supported with its circumference adjacent to the inner face surfaces of the edge portions 15, 17 of the tube blank. It will be understood that a portion of the flux which flows from one pole piece 57 into the adjacent edge portion of the tube blank may flow from this edge portion into the inner core 75 and may continue therein in a path of low reluctance to flow through other edge portions of the tube blank disposed adjacent to the opposite pole piece 57 and then into this opposite pole piece. Such a provision affords substantial improvement in securing flow of the flux transversely of the edge portions of the tube blank, but a large part of the flux still would flow directly across the air gap between the two pole pieces and would be ineffective for induction heating of the edge portions 15, 17 of the tube blank.

In accordance with a significant feature of the invention, within the space between the pole pieces 57 is disposed a magnetic flux barrier 91 which in the embodiment disclosed is of generally rectangular cross section, as shown in FIG. 3, and has its length extending parallel to the direction of movement of the tube blank for the greater part of the length of the space 28 between the walls 31 and 33, as shown in FIG. 4. The magnetic flux barrier 91 of highly conductive material may be supported by suitable means, such as the bolts 93, shown in FIG. 4, threaded in the upper edge of the barrier 91 and passing through the slab 29, these bolts being provided with nuts 95 at the upper ends thereof. The barrier 91 also may be provided with a cooling duct 97 continuous between the openings 99 at the upper edge thereof, inlet and outlet pipes 101 and 103 being connected to the openings 99 for delivering and withdrawing cooling fluid, such as water, for limiting the temperature of this magnetic flux barrier because of the development of eddy current therein producing the counterflux as above mentioned. Insulating bushings 94 for the bolts 93 and insulating washers 96 under the nuts 95 are provided to insulate the bolts and nuts from the slab 29. Insulating bushings 104 are provided to insulate the pipes 101, 103 from the slab 29.

It will be noted that the lower end of the magnetic flux barrier 91 is disposed adjacent and, in the embodiment of FIG. 3, partially within the space between the opposite edge surfaces of the tube blank that are transverse to cylindrical face surfaces of this blank. Within the scope of the invention the lower end portion of the barrier 91 may be extended downwardly through the space between the edge portions 15, 17 of the tube blank, as shown in FIG. 6, to the position closely adjacent to the inner magnetic core 105 further to be described. The flux which otherwise would pass across the air gap between the pole pieces 57 is diverted by the barrier 91 so that, for the most part, the flux passes from a pole piece 57 through an edge portion of the tube blank and through the inner magnetic core 75 and then through the other edge portion of the tube blank into the opposite pole piece 57. Because of the increase thus secured in the density of the flux passing through the edge portions of the tube blank a greater current is induced in these edge portions and, therefore, a greater increase in the temperautre thereof is secured for a given flux density developed in the main core 35 by the current flowing in the windings 39. The edge portions 15, 17 thus may be raised to welding temperature during movement of the tube blank through the induction heating apparatus 23 and the length of travel through this apparatus may be relatively short for a given size of tube blank and thickness of the wall thereof for a given material.

In the preferred embodiment shown more particularly in FIGS. 3 and 4 the inner magnetic core 75 is supported by a mandrel 111. This mandrel is of cylindrical form in the end portions 113 and 115 thereof and is hollow with an inner space 117 defined by the annular wall 119 except for a portion of the length of the mandrel which is disposed beneath the main core 35 and its pole pieces 57. This central portion of the length of the mandrel is provided by an inner wall 121, FIGS. 3 and 4, which is of cylindrical form substantially concentric with the inner core 75. Thus there is provided a depression defined by the wall 121 and end walls 123 connecting the wall 121 to the wall 119 at the upper side of the mandrel in which the sections 77, 79, 81 of the inner core 75 are disposed. Between the cylindrical wall 121 and the circumferential surfaces of the sections 77, 79, 81 of the inner core 75 a layer 125 of insulating material is disposed to prevent flow of eddy current between the core 75 and the wall 121, this wall being made of highly conductive material. Thus the wall 121 serves as a barrier or deflector for confining the flux which enters the core 75 from one of the edge portions of the tube blank to flow through the core and through the other edge portion of the tube blank and return to a pole piece of the main magnetic core.

The hollow mandrel 111 is provided with a tapered end portion 127 as shown in FIG. 4 for guiding the tube blank to the desired position in relation to the inner core 75. This mandrel is provided with upwardly projecting lugs 129, 131 which are secured respectively to brackets 133, 135 carried by the end walls 31, 33 by means of bolts 137, 139. Thus the weight of the mandrel and of the core 75 supported thereby is carried by the walls of the shielding structure 23 supported on the base 25. It will be understood that the upwardly projecting lugs 129, 131 pass upwardly through the space between the adjacently disposed edge portions 15, 17 of the tube blank, this space being maintained throughout the length of the tube blank in the movement thereof through the induction heating apparatus until the blank reaches the welding rolls 19. These lugs also are provided with fluid conveying openings 141 through which a cooling fluid, such as water, may flow into the hollow space 117 of the mandrel 111 for cooling this mandrel and for cooling also the flux deflecting wall 121 which supports the core 75.

In FIGS. 3 and 4, along the bottom edge surface of the barrier 91 a layer 145 of insulating material extends separating the barrier 91 from the inner core 75 to insure against flow of current between the magnetic flux barrier 91 and the core 75. As is indicated in FIGS. 3 and 4 the insulation layer 145 may be engaged by the circumferential surface of the core 75, this core supported by the mandrel 111 being in fixed relation with respect to the barrier 91. A closely spaced relation thus may be secured between the inner magnetic core 75 and the edge portions 15, 17 of the tube blank even if some transverse movement of these edge portions may take place in the movement of the tube blank 13 lengthwise of the mandrel. A layer 146 of insulating material at the top edge of the barrier 91 insulates it from the conductive layer 71.

As shown in FIGS. 3 and 6 transverse wing portions 147 may be provided on the magnetic flux barrier 91 extending laterally therefrom above the pole pieces 57 of the magnetic core 35 to aid in deflecting the magnetic flux downwardly from the pole pieces to and through the edge portions 15, 17. In the embodiment shown the wings 147 are formed integral with the barrier 91.

In the embodiment of FIG. 6 the inner core 105 of ferromagnetic material and preferably of laminated structure to prevent eddy currents in the conventional manner is formed with two lateral projections 151 and a bottom projection 153. These projections extend lengthwise of the core and are of such width and radial dimension as to engage the inner face surface of the tube blank to provide wear surfaces and alignment of the blank 13 with respect to the inner magnetic core 105 and with respect to the path of the flux as it is formed between the pole pieces 57, this path including the inner magnetic core and traversing the edge portions 15, 17 of the tube blank. As above mentioned, in this embodiment the flux is forced downwardly toward the inner core 105 about the lower rounded edge contour 155 of the barrier 91 in FIG. 6. A layer 156 of insulating material of arcuate form may be disposed between the concave upper surface of the inner core and the rounded edge 155 of the barrier to insulate these parts.

It will be understood that the apparatus of the invention, having regard to the highly effective and efficient induction heating of the edge portions 15, 17 of the tube blank secured thereby, may be mounted so as to receive the skelp in the form of the strip of rectangular section directly from the hot mill which rolls the skelp to this rectangular form. By this arrangement the skelp is formed in the shoe 3 while still retaining a substantial amount of its heat and is further formed at the rolls 5, 7 to the tube blank 13 without the need of handling the skelp in different machines before bringing the tube blank to the welding machine. As shown, the tube blank 13 is delivered directly to the induction heating apparatus 23 and immediately after leaving this heating apparatus is passed through the welding rolls 19 to effect the welding of the edge portions 15, 17 together.

In order to secure a good condition for welding the edge surfaces of the wall of the tube blank that are transverse to the inner and outer face surfaces of this tube blank, a nozzle 157 may be disposed in a location between the induction heater 23 and the welding rolls 19. Through a supply pipe 159 oxygen may be delivered to the nozzle 157, this nozzle being directed toward the edge portions 15, 17. A vigorous exothermal chemical reaction takes place as the oxygen strikes the hot metal and this reaction flashes off the scale which has become formed on the metal in the heating thereof in the prior processes. This reaction further raises the surface temperature of the edge portions 15, 17 of the tube blank so that requisite welding temperature is maintained as the blank enters the welding roll 19. Any scale remaining on these transverse surfaces is extruded from between the surfaces as the pressure of the rolls 19 is exerted on the edge portions 15, 17. A weld of high integrity of molecular structure and of high strength thus is secured by virtue of the control of the temperature and of the condition of the metal which is made possible by the apparatus of this invention.

The following tabulation is indicative of the results which are secured and the conditions for obtaining these results in the apparatus of the present invention:

| | |
|---|---|
| Primary winding turns | 4. |
| Volts per turn | 80. |
| Supply voltage | 320. |
| Frequency, cycles per second | 10,000. |
| Cross section main core | 18 sq. in. |
| Length flux path | 18 inches. |
| Total air gap length | .625 inch. |
| Power input | 125 kw. |
| Power consumed | 85 kw. |
| Inductive heating efficiency | 60%–70%. |
| Speed of tube | 400–800 feet/min. |
| Temp. rise in weld area | 1000° F. |
| Material of tube, steel in austenitic state: | |
| Power factor | 30%–40%. |

The above tabulation is given merely by way of example. To suit different conditions of operation, different materials and dimensions of the tube blank and other factors, the data given in the tabulation may be varied while utilizing the essential concept of the invention as described. It is possible with the apparatus of the invention to heat the edge portions of the tube blank to the welding temperature which for steel of the type indicated may be about 2300 to 2500 degrees Fahrenheit.

The apparatus thus may raise the temperature of the skelp as it is received from the hot mill at a temperature, for example, of 1300 degrees to 1500 degrees Fahrenheit up to the requisite welding temperature. By controlling the current flow in the windings for a given type of material in the tube blank the welding temperature may be controlled within narrow limits for uniform and efficient welding. The added temperature may be varied between 800 degrees and 1200 degrees Fahrenheit.

Within the scope of the invention and to suit conditions for induction heating of tube blanks of magnetic and nonmagnetic materials and of various dimensions, the frequency used may be in the range between 60 cycles per second and one megacycle per second. The invention is not limited, however, to this range of frequency.

With the apparatus as described the efficiency obtained may be in the range between 60% and 70% and the power factor of the induction heating apparatus may be in the range from 30% to 40%. These results may be obtained with tubing of practical commercial diameters and wall thickness with a speed of the tube through the induction heating apparatus substantially in the range between 400 and 800 feet per minute. For such commercial products, particularly tubing of ferromagentic material, the power factor may be improved by an amount of 15 to 20% with respect to presently attainable power factors in induction heating apparatus.

The structure which includes the core 35 and the windings 39 as well as curtain walls 65 may be secured to the upper slab 29 so that these parts of the structure may be lifted as a unit out of the space 28 defined by the walls 27, 31, 33. By providing the insulating layer 59 between the lower ends of the legs 37 of the core, this inner structure may be moved upwardly with respect to the pole pieces 57 which may remain in place and may be examined as to their condition from time to time. As the heating effected by the eddy currents which are developed in the lower portion of barrier 91 and particularly in the edge portions 15, 17, of the tube blank is concentrated adjacent these edge portions, the pole pieces and the inner core 75 may deteriorate. These parts may be considered as expendable to the extent necessary as compared with the body of the main core 35, the windings 39, terminals 41 and the curtain walls 65. As the lower edge portion of the barrier 91 is cooled and as also the barrier wall 121 of the mandrel is cooled, it will be understood that by removing the parts supported by the slab 29 the pole pieces 57 may be removed for replacement if damaged by the heat and access then may be secured to the inner core 75 for renewing its sections if necessary. Preferably the mandrel 111 is made of a material which is nonmagnetic but also, while being electrically conductive, is not highly conductive. This mandrel, for example, may be made of stainless steel to provide these characteristics. Such material is also resistant to heat and when cooled in the manner disclosed will have a relatively long life.

The removable structure which includes the current carrying coils and other parts, not shown, for cooling the core and coils constitutes the portion of the apparatus replaceable with more difficulty and expense than the pole pieces 57 and the inner core 75 that are disposed below the removable structure. The only connections to these lower parts are the fluid connections at the openings 141 which are disposed in fixed relation to the base and removably connected by the bolts 137, 139 to the walls 31, 33. If desired in some constructions, although not so shown in FIGS. 3, 4 and 5, the walls 27, 31, 33 also may be made removable with respect to the base 25 of the apparatus.

Within the scope of the invention variations may be made in the dimensions and in the materials used for the apparatus to meet different conditions and to effect the induction heating of tube blanks of different materials and different sizes, while providing the features of the magnetic barriers which confine the flux to desired path through the edge portions of the tube blank. All such variations are intended to come within the scope of the appended claims.

We claim:

1. In apparatus for induction heating for longitudinal seam welding of tubing of conductive material, the combination with means for forming a tube blank with the tube wall extending about the space within the tube and with the edge portions of the wall to be welded in adjacent but spaced relation along the length of the blank, and means for moving said tube blank lengthwise thereof, of means providing a magnetic flux circuit having a main portion exterior to said tube wall and an inner portion disposed within said space defined by said tube wall, a magnetic flux barrier having at least the edge portion thereof disposed adjacent to the space defined between said spaced edge portions of said tube wall so that said magnetic circuit substantially is determined by said main portion thereof and by said inner portion thereof, said edge portions of said tube blank being disposed in the path of the flux between said main portion of said circuit and said inner portion thereof, and means for varying the magnetic flux in said circuit to effect induction heating of said edge portions of said tube wall.

2. In apparatus for induction heating for longitudinal seam welding of tubing of conductive material, the combination with means for forming a tube blank with the tube wall extending about the space within the tube and with the edge portions of the wall to be welded in adjacent but spaced relation along the length of the blank, and means for moving said tube blank lengthwise thereof, of a main magnetic core having the poles thereof disposed exteriorly of said tube blank and spaced apart transversely of the length of said tube blank, said poles respectively being disposed adjacent to said edge portions of said tube wall, an inner magnetic core disposed within said space defined by said tube wall and adjacent to said edge portions of said tube wall, a magnetic flux barrier disposed within the space between said poles of said main magnetic core and having at least the edge portion thereof disposed adjacent to the space defined between said spaced edge portions of said tube wall so that the magnetic circuit substantially is determined in said main magnetic core and in said inner magnetic core, said edge portions of said tube blank being disposed in the path of the flux between said main magnetic core and said inner magnetic core, and means for varying the magnetic flux in said main magnetic core to vary the flux in said circuit to effect induction heating of said edge portions of said tube wall.

3. In apparatus for induction heating the combination as defined in claim 2 in which said magnetic barrier comprises an electrically conductive member disposed generally in the plane of the space between said edge portions of said tube wall and the central axis of the tube blank, an edge of said conductive member being disposed adjacent but in insulated relation to said inner magnetic core so that said member serves to divert the flux to pass through said spaced edge portions of said tube generally transversely thereof and through said inner magnetic core.

4. In apparatus for induction heating the combination as defined in claim 2 which comprises a mandrel disposed within and extending longitudinally of said tube blank and supporting said inner magnetic core, and means disposed in the space between said spaced edge portions of said tube wall and connected to said mandrel for supporting said mandrel and said inner magnetic core within said tube blank.

5. In apparatus for induction heating the combination as defined in claim 2 in which said main magnetic core provides a pair of generally parallel pole legs, and pole pieces adjacent the ends of said pole legs and extending transversely thereof toward each other, the adjacent ends of said pole pieces being spaced apart, said pole pieces respectively being disposed exteriorly of and adjacent to but spaced from said edge portions of said wall of said tube blank, said inner magnetic core providing an exterior surface extending along the inner surfaces of said edge portions of said tube blank and adjacent to but in spaced relation thereto.

6. In apparatus for induction heating the combination as defined in claim 5 in which said exterior surface of said inner core is arcuate in section transverse to the length of said tube and extends along the inner surface of said tube wall.

7. In apparatus for induction heating the combination as defined in claim 2 which comprises a mandrel disposed within and extending longitudinally of said tube blank, said mandrel being provided with an open elongated channel extending lengthwise of said mandrel, said inner magnetic core being disposed in said channel and supported by said mandrel, and means disposed in the space between said spaced edge portions of said tube wall and connected to said mandrel for supporting said mandrel and said inner magnetic core within said tube blank.

8. In apparatus for induction heating the combination as defined in claim 1 which comprises means connected to said magnetic barrier and cooperating therewith to effect cooling thereof.

9. In apparatus for induction heating the combination as defined in claim 1 in which said magnetic barrier is formed of conductive material and is provided with a fluid duct defined by the material of said barrier for conveying cooling fluid therethrough, and means for delivering cooling fluid to said duct.

10. In apparatus for induction heating the combination as defined in claim 2 which comprises a mandrel of a conductive material of high magnetic reluctance and of substantial resistivity disposed within and extending longitudinally of said tube blank and supporting said inner magnetic core in said position adjacent to said edge portions of said tube wall, and means disposed in the space between said spaced edge portions of said tube wall and connected to said mandrel for supporting said mandrel and said inner core within said tube blank.

11. In apparatus for induction heating the combination as defined in claim 10 which comprises means connected to said mandrel for cooling said mandrel.

12. In apparatus for induction heating the combination as defined in claim 2 which comprises a shielding structure of conductive material extending about said main magnetic core and cooperating with said magnetic flux barrier to confine the flux substantially to said path between said main magnetic core and said inner magnetic core transversely of said edge portions of said wall of said tube blank.

13. In apparatus for induction heating the combination as defined in claim 2 in which said main magnetic core provides a pair of generally parallel pole legs, and pole pieces adjacent the ends of said pole legs, said magnetic flux barrier being disposed between said pole pieces, and insulating material of restricted thickness to limit the reluctance of the magnetic circuit disposed between said ends of said pole legs and the respective pole pieces to insulate against flow of eddy currents between said pole legs and said pole pieces.

14. In apparatus for induction heating the combination as defined in claim 2 which comprises a shielding structure of conductive material extending about said main magnetic core and cooperating with said magnetic flux barrier to confine the flux substantially to said path between said main magnetic core and said inner magnetic core, and a layer of insulating material about said main magnetic core and between said main magnetic core and said shielding structure to insulate against flow of eddy currents between said main magnetic core and said shielding structure.

15. In apparatus for induction heating the combination as defined in claim 2 which comprises a mandrel disposed within and extending longitudinally of said tube blank and supporting said inner magnetic core, means disposed within the space between said edge portions of said tube wall and connected to said mandrel for supporting said mandrel and said inner magnetic core within said tube blank, and magnetic flux barrier means supported by said mandrel between said mandrel and said inner magnetic core for substantially confining said flux within said tube blank to the path through said inner core.

16. In apparatus for induction heating the combination as defined in claim 15 which comprises an insulating material disposed between said magnetic flux barrier means and said inner magnetic core.

17. In apparatus for induction heating the combination as defined in claim 15 which comprises means for cooling said mandrel and said magnetic flux barrier means supported thereby.

18. In apparatus for induction heating the combination as defined in claim 2 in which said means for varying the magnetic flux in said main magnetic core comprises a conductive coil about said core, and an alternating current supply connected to said coil.

19. In apparatus for induction heating the combination as defined in claim 2 which said inner magnetic core has a form providing for engaging the inner surface of the tube wall so that said core serves as a guide mandrel within said tube blank.

20. In apparatus for induction heating the combination as defined in claim 2 in which said inner magnetic core is formed with a channel extending lengthwise thereof and open toward said magnetic flux barrier, said barrier being formed with an edge surface adjacent said inner core contoured in generally parallel relation to the surface of said channel of said core.

21. In apparatus for induction heating for longitudinal seam welding of tubing of conductive material, the combination with means for forming a tube blank with the tube wall extending about the space within the tube wall extending about the space within the tube and with the edge portions of the wall to be welded in adjacent but spaced relation along the length of the blank, and means for moving said tube blank lengthwise thereof, of means providing a magnetic flux circuit having a main portion exterior to said tube wall and a second portion which traverses said adjacent but spaced edge portions of said wall, a magnetic flux barrier having at least the edge portion thereof disposed adjacent to the space defined between said spaced edge portions of said tube wall so that said second portion of said circuit extends about said edge portion of said barrier through said spaced edge portions of said tube blank, and means for varying the magnetic flux in said circuit to effect induction heating of said edge portions of said tube wall.

References Cited by the Examiner
UNITED STATES PATENTS

| | | | |
|---|---|---|---|
| 2,762,892 | 9/56 | Park | 219—8.5 |
| 3,038,055 | 6/62 | Ross | 219—8.5 |

RICHARD M. WOOD, *Primary Examiner.*